(12) United States Patent
Kim et al.

(10) Patent No.: US 9,699,715 B2
(45) Date of Patent: Jul. 4, 2017

(54) DISCOVERY METHOD AND DEVICE IN A WIRELESS COMMUNICATION SYSTEM

(71) Applicant: LG ELECTRONICS INC., Seoul (KR)

(72) Inventors: Suhwook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 14/759,640

(22) PCT Filed: Jan. 6, 2014

(86) PCT No.: PCT/KR2014/000095
§ 371 (c)(1),
(2) Date: Jul. 7, 2015

(87) PCT Pub. No.: WO2014/109513
PCT Pub. Date: Jul. 17, 2014

(65) Prior Publication Data
US 2015/0351018 A1  Dec. 3, 2015

Related U.S. Application Data

(60) Provisional application No. 61/750,370, filed on Jan. 9, 2013, provisional application No. 61/913,926, filed on Dec. 10, 2013.

(51) Int. Cl.
*H04W 48/16* (2009.01)
*H04W 76/02* (2009.01)
(Continued)

(52) U.S. Cl.
CPC ........... *H04W 48/16* (2013.01); *H04W 8/005* (2013.01); *H04W 76/023* (2013.01); *H04W 84/12* (2013.01)

(58) Field of Classification Search
CPC . H04W 8/005; H04W 74/08; H04W 74/0808; H04W 74/0816; H04W 76/023
See application file for complete search history.

(56) References Cited

U.S. PATENT DOCUMENTS

2004/0006705 A1\* 1/2004 Walker ................. H04B 7/2662
726/3
2006/0084460 A1\* 4/2006 Matsuo ............... H04W 52/146
455/522
(Continued)

FOREIGN PATENT DOCUMENTS

| KR | 10-2012-0045628 | 5/2012 |
| WO | 2012/096546 | 7/2012 |
| WO | 2012/115385 | 8/2012 |

OTHER PUBLICATIONS

PCT International Application No. PCT/KR2014/000095, Written Opinion of the International Searching Authority dated May 15, 2014, 16 pages.

*Primary Examiner* — Scott M Sciacca
(74) *Attorney, Agent, or Firm* — Lee Hong Degerman Kang Waimey

(57) ABSTRACT

An embodiment of the present invention entails a method in which discovery is effected by a first device supporting a WiFi direct service, the method comprising the steps of: scanning usable channels; switching channel to a first channel; and effecting a procedure relating to probe sending and receiving, together with a second device on the first channel. Here, the first channel is determined from either a time stamp or the scanning result.

12 Claims, 11 Drawing Sheets

(51) Int. Cl.
  *H04W 8/00*     (2009.01)
  *H04W 84/12*    (2009.01)

(56) References Cited

U.S. PATENT DOCUMENTS

| | | |
|---|---|---|
| 2011/0149806 A1 | 6/2011 | Verma et al. |
| 2012/0165056 A1* | 6/2012 | Kim .................. H04W 16/14 |
| | | 455/509 |
| 2012/0213110 A1* | 8/2012 | Yamaguchi ......... H04W 72/082 |
| | | 370/252 |
| 2012/0243524 A1 | 9/2012 | Verma et al. |
| 2012/0275361 A1* | 11/2012 | Berenberg ............ H04W 48/16 |
| | | 370/311 |
| 2013/0033995 A1* | 2/2013 | Kraglund .............. H04W 48/16 |
| | | 370/252 |
| 2015/0156723 A1* | 6/2015 | Locher ................. H04W 48/16 |
| | | 370/311 |
| 2016/0248564 A1* | 8/2016 | Qi ........................ H04W 56/00 |

\* cited by examiner first WFD device (mobile phone)

second WFD device (display device)

(a)

"A" associated with "B"

(b)

● Group Owner  ◐ Group Client  —✕— Link termination (a)

"A" associated with "B"

(b)

● Group Owner  ◐ Group Client  ⊜ Not in group (a)

"A" associated with "B"

(b)

● Group Owner  ◎ Group Client  —✕— Link termination

Octets :  8

(a)

| Bit pattern (MSB) | Channel |
|---|---|
| 00 | 1 |
| 01 | 6 |
| 10 | 11 |
| 11 | Best channel |

(b)

| BSSID | Channel | Signal strength |
|---|---|---|
| Coffee - One | 1 | Medium |
| MyHome | 3 | High |
| Guest | 6 | Low |
| Free - wifi | 11 | Low |
| AT&T | 11 | High |

DISCOVERY METHOD AND DEVICE IN A WIRELESS COMMUNICATION SYSTEM

CROSS-REFERENCE TO RELATED APPLICATIONS

This application is the National Stage filing under 35 U.S.C. 371 of International Application No. PCT/KR2014/000095, filed on Jan. 6, 2014, which claims the benefit of U.S. Provisional Application Nos. 61/750,370, filed on Jan. 9, 2013 and 61/913,926, filed on Dec. 10, 2013, the contents of which are all hereby incorporated by reference herein in their entirety.

TECHNICAL FIELD

The present invention relates to a wireless communication system, and more particularly to a discovery method and apparatus associated with a Wi-Fi direct.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

Wi-Fi Direct or Wi-Fi P2P (Peer-to-Peer) has been intensively discussed as a direct communication technology capable of easily interconnecting a plurality of devices without using a radio access point (AP) basically requisite for a conventional WLAN system. Through the Wi-Fi direct, the plurality of devices may be connected o each other without using a complicated configuration process. In order to provide a variety of services to users or UEs, it may be possible to support a data communication operation at a transfer rate of a general WLAN system.

In recent times, various Wi-Fi support devices have been used, and the number of Wi-Fi Direct support devices configured to perform communication between the Wi-Fi devices without using the AP is rapidly increasing. In Wi-Fi Alliance (WFA), a technology for introducing a platform supporting a variety of services (e.g., Send, Play, Display, Print, etc.) using a Wi-Fi Direct link has been discussed. This technology may be referred to as a Wi-Fi Direct service (WFDS). In accordance with the WFDS, applications, services, etc. can be controlled or managed by a service platform referred to as an application service platform (ASP).

DISCLOSURE

Technical Problem

An object of the present invention is to provide discovery associated methods in Wi-Fi direct.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing discovery by a first device supporting a Wi-Fi Direct service including: scanning a plurality of available channels; performing channel switching to a first channel; and performing a probe transmission/reception (Tx/Rx)—associated procedure with a second device through the first channel, wherein the first channel is determined from one selected from among a timestamp and the scanning result.

In accordance with another aspect of the present invention, a first device for supporting a Wi-Fi Direct service includes: a reception (Rx) module; and a processor, wherein the processor scans a plurality of available channels, performs channel switching to a first channel, and performs a probe transmission/reception (Tx/Rx)—associated procedure with a second device through the first channel, wherein the first channel is determined from one selected from among a timestamp and the scanning result.

First and second technical aspects of the present invention may include at least one of the following items.

If the first channel is determined by the timestamp and access points (APs) of the first device and the second device are identical to each other, a probe request frame may be transmitted from one device winning competition for the first channel, from among the first device and the second device.

If the first channel is determined from the scanning result, a probe request frame may be transmitted from one device winning competition for the first channel, from among the first device and the second device.

2 most significant bits (MSBs) of the timestamp may indicate a plurality of channels including the first channel.

The plurality of channels may include Channel #1, Channel #6, and Channel #11.

If the first channel is determined by the timestamp, the channel switching may be performed after lapse of a predetermined time after reception of a beacon frame including the timestamp.

If the first channel is determined from the scanning result, the first channel may be set to one channel having no access point (AP) from among Channel #1, Channel #6, and Channel #11.

If the number of channels having no AP is 2 or more, the first channel may be a channel having a low channel number.

If the first channel is determined from the scanning result, the first channel may be one channel having the lowest signal intensity from among Channel #1, Channel #6, and Channel #11.

If the first channel is determined from the scanning result, the first channel may be dependent upon an access point (AP) discovered by the first device.

The access point (AP) may have association in advance before the first device and the second device perform the discovery.

If the first channel is determined from the scanning result, the first channel may be dependent upon the scanning time of the first device.

Advantageous Effects

As is apparent from the above description, exemplary embodiments of the present invention can greatly reduce times needed for discovery. In addition, the embodiments can reduce UE power consumption needed for a discovery procedure.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
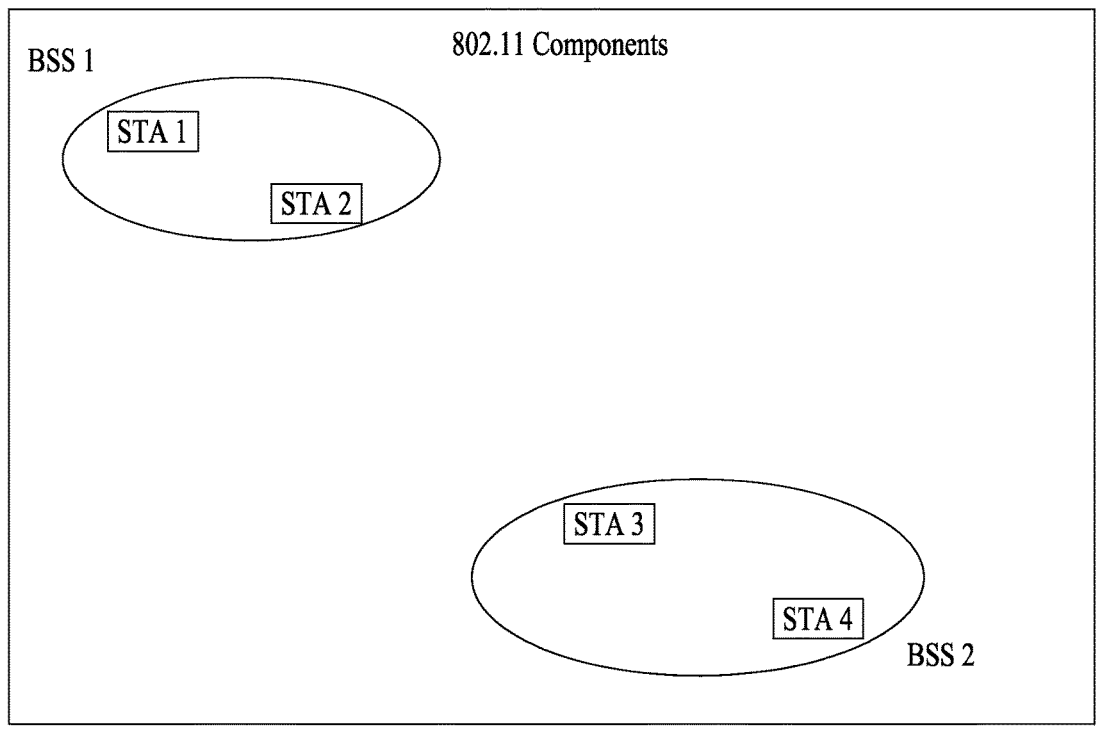
FIG. 1 is a conceptual diagram illustrating an IEEE 802.11 system according to an embodiment of the present invention.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, the present disclosure focuses on the IEEE 802.11 system. However, the technical features of the present invention are not limited thereto.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to higher layers may be provided through interaction between the components. A Basic Service Set (BSS) is a basic building block of an IEEE 802.11 WLAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 WLAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of WLAN is often formed without pre-planning for only as long as the WLAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

In addition, FIG. 1 illustrates components such as a Distribution System (DS), a Distribution System Medium (DSM), an Access Point (AP), etc.

In a WLAN, PHYsical layer (PHY) limitations determine a direct station-to-station distance that may be supported. For some networks, this distance may be sufficient, whereas for other networks, communication between STAs farther from each other may be required. To support increased coverage, a DS may be configured.

An architectural component used to interconnect BSSs is the DS. Instead of existing independently, a BSS may also form a component of an extended form of a network that is built with multiple BSSs.

The DS is a logical concept and may be defined by characteristics of the DSM. In this regard, IEEE 802.11 logically separates the Wireless Medium (WM) from the DSM. Each logical medium is used for a different purpose by a different component of the architecture. The IEEE 802.11 definitions neither preclude, nor demand, that the multiple media be either the same or different. Recognizing that the multiple media are logically different is a key to understanding of the flexibility of the architecture. The IEEE 802.11 WLAN architecture may be realized in various manners and may be specified independently of the physical characteristics of any specific implementation.

The DS may support mobile devices by providing logical services needed to handle address-to-destination mapping and seamless integration of multiple BSSs.

An AP is an entity that provides access to the DS to associated STAs in addition to acting as an STA. Data may move between a BSS and the DS via an AP. For example, STA2 and STA3 illustrated in FIG. 1 provide access to the DS to associated STAs (STA1 and STA4), having STA functionality. Since all APs are basically STAs, they are addressable entities. Addresses used by an AP for communication on the WM and DSM are not necessarily the same.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Layer Architecture

In the WLAN system, an operation of an STA may be described from the perspective of layer architecture. Layer architecture in terms of device configuration may be implemented by a processor. An STA may have a plurality of layer structures. For example, the 802.11 standard specifications mainly deal with the Medium Access Control (MAC) sublayer of the Data Link Layer (DLL) and the PHY layer. The PHY layer may include a Physical Layer Convergence Protocol (PLCP) entity and a Physical Medium Dependent (PMD) entity. Both the MAC sublayer and the PHY layer conceptually include management entities, called MAC Sublayer Management Entity (MLME) and PHY Layer Management Entity (PLME). These entities provide layer management service interfaces through which layer management functions may be invoked.

In order to provide a correct MAC operation, a Station Management Entity (SME) is present within each STA. The SME is a layer-independent entity that may be viewed as residing in a separate management plane or as residing off to the side. The exact functions of the SME are not specified herein, but in general this entity may be viewed as being responsible for such functions as gathering of information about layer-dependent statuses from various Layer Management Entities (LMEs) and similarly setting of the values of layer-specific parameters. The SME may typically perform such functions on behalf of general system management entities and may implement standard management protocols.

The foregoing entities interact in various ways. For example, the entities may interact with each other by exchanging GET/SET primitives. A primitive refers to a set of elements or parameters related to a specific purpose. An XX-GET.request primitive is used to request the value of a given MIB attribute (management information-based attribute information). An XX-GET.confirm primitive returns an appropriate MIB attribute value if Status="success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status="success," and otherwise, it returns an error condition in the Status field. If this MIB attribute implies a specific action, then this confirms that the action was performed.

The MLME and the SME may exchange various MLME_GET/SET primitives via an MLME_SAP (Service Access Point). Also, various PLMEM_GET/SET primitives may be exchanged between the PLME and the SME via a PLME_SAP and between the MLME and the PLME via an MLME-PLME_SAP.

Evolution of WLAN

The IEEE 802.11 group is working on the standardization of WLAN. IEEE 802.11a and IEEE 802.11b use an unlicensed band in 2.4 GHz or 5 GHz. IEEE 802.11b offers a data rate of 11 Mbps, whereas IEEE 802.11a offers a data rate of 54 Mbps. IEEE 802.11g offers 54 Mbps by applying Orthogonal Frequency Division Multiplexing (OFDM) in 2.4 GHz and IEEE 802.11n offers 300 Mbps by applying Multiple Input Multiple Output-OFMD (MIMO-OFDM). IEEE 802.11n supports a channel bandwidth of up to 40 MHz. In this case, it provides a data rate of 600 Mbps.

In a WLAN environment conforming to IEEE 802.11e, a Direct Link Setup (DLS)-related protocol is based on the premise of a Quality BSS (QBSS) meaning that a BSS supports Quality of Service (QoS). In the QBSS, an AP as well as a non-AP STA is a Quality AP (QAP) supporting QoS. However, even though a non-AP STA is a Quality STA (QSTA) supporting QoS in a current commercialized WLAN environment (e.g., conforming to IEEE 802.11a/b/g), most of APs are legacy APs that do not support QoS. As a result, the DLS service is not available even to a QSTA in the current commercialized WLAN environment.

Tunneled Direct Link Setup (TDLA) is a new wireless communication protocol proposed to overcome this limitation. Although the TDLS does not support QoS, it enables QSTAs to establish direct links even in the current commercialized IEEE 802.11a/b/g WLAN environment and also even in Power Save Mode (PSM). Accordingly, the TDMS specifies an overall procedure for enabling QSTAs to establish direct links even in a BSS managed by a legacy AP. Herein below, a wireless network supporting the TDLS is referred to as a TDLS network.

Wi-Fi Direct Network

A legacy WLAN mainly deals with operations of an infrastructure BSS in which a wireless AP functions as a hub. An AP is responsible for supporting the PHY layer for wireless/wired connectivity, routing for devices in a network, and providing a service to add/remove a device to/from a network. In this case, devices of the network are connected to each other via the AP, not directly.

Standardization of Wi-Fi Direct as a technology supporting direct connectivity between devices is under discussion.

Figure 2:
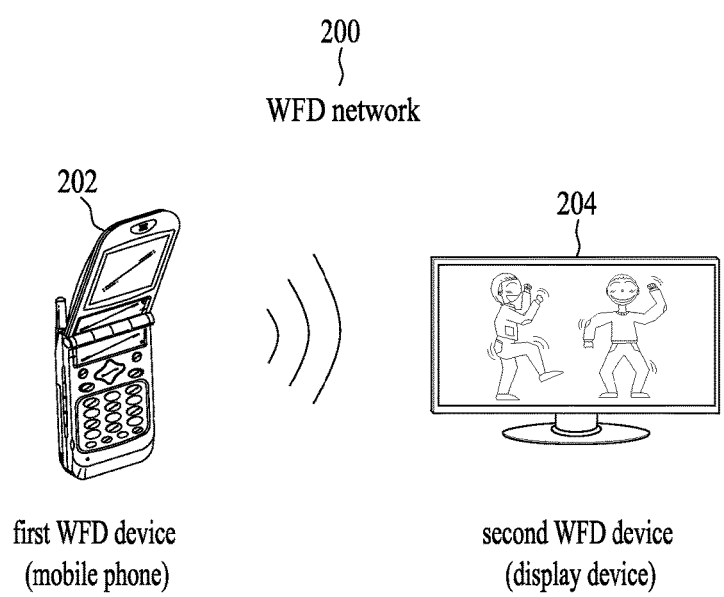
FIG. 2 is a conceptual diagram illustrating a Wi-Fi Direct network.

FIG. 2 illustrates an exemplary Wi-Fi Direct network. The Wi-Fi Direct network, which was proposed by the Wi-Fi Alliance (WFA), enables Wi-Fi devices to conduct Device-to-Device (D2D) (or Peer-to-Peer (P2P)) communication without joining a home network, an office network, and a hotspot network. Hereinafter, Wi-Fi Direct-based communication will be referred to as WFD D2D communication (shortly D2D communication) or WFD P2P communication (shortly, P2P communication). Also, a WFD P2P-enabled device will be referred to as a WFD P2P device, or shortly a P2P device.

Referring to FIG. 2, a WFD network 200 may include one or more Wi-Fi devices, for example, a first WFD device 202 and a second WFD device 204. The WFD devices include Wi-Fi-enabled devices such as a display device, a printer, a digital camera, a projector, and a smartphone. Also, the WFD devices include a non-AP STA and an AP STA. In the illustrated example, the first WFD device 202 is a portable phone and the second WFD device 204 is a display device. In the WFD network, WFD devices may be connected directly to each other. Specifically, P2P communication may refer to direct setup of a signal transmission path between two WFD devices without intervention of a third device (e.g., an AP) or a legacy network (e.g., connection to a WLAN via an AP). The signal transmission path established directly between the two WFD devices may be limited to a data transmission path. For example, P2P communication may mean transmission of data (e.g., audio/video/text information, etc.) between a plurality of non-AP STAs without intervention of an AP. A signal transmission path for control information (e.g., resource allocation information for P2P setup, wireless device identification information, etc.) may be established directly between WFD devices (e.g., between a non-AP STA and a non-AP STA or between a non-AP STA and an AP), between two WFD devices (e.g., a non-AP STA and a non-AP STA) via an AP, or between an AP and a WFD device (e.g., between an AP and non-AP STA #1 or between an AP and non-AP STA #2).

Figure 3:
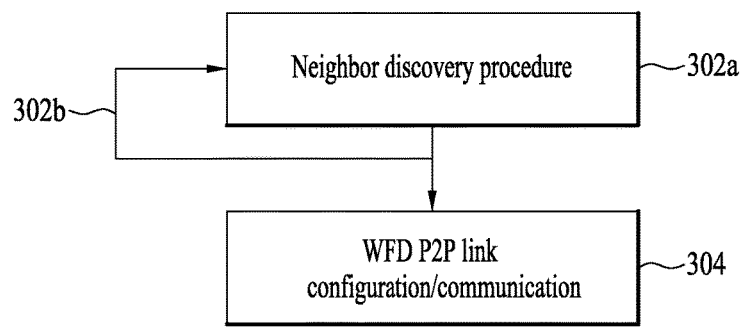
FIG. 3 is a flowchart illustrating a method for constructing a Wi-Fi Direct network.

FIG. 3 is a flowchart illustrating an operation for configuring a WFD network.

Referring to FIG. 3, the operation for configuring a WFD network may be divided largely into two procedures. One of the procedures is a Neighbor Discovery (ND) procedure (S302a) and the other is a P2P link setup and communication procedure (S304). A WFD device (e.g., the WFD device 202 in FIG. 2) may discover another neighbor WFD device (e.g., the WFD device 204 in FIG. 2) within its (wireless) coverage and may acquire information required for association, for example, pre-association with the WFD device. Herein, pre-association may mean Layer 2 (L2) pre-association in a radio protocol. The information required for pre-association may include, for example, identification information about the neighbor WFD device. The ND procedure may be performed on an available radio channel basis (S302b). Then, the WFD device 202 may perform the WFD P2P link setup/communication procedure with the other WFD device 204. For example, after the WFD device 202 is associated with the neighbor WFD device 204, the WFD device 202 may determine whether the WFD device 204 satisfies a service requirement of a user. For this purpose, the WFD device 202 may search for the WFD device 204 after the L2 pre-association with the WFD device 204. If the WFD device 204 does not satisfy the user's service requirement, the WFD device 202 may release the L2 association with the WFD device 204 and then may set up L2 association with another WFD device. On the other hand, if the WFD device 204 satisfies the user's service requirement, the two WFD devices 202 and 204 may transmit and receive signals via a P2P link.

Figure 4:
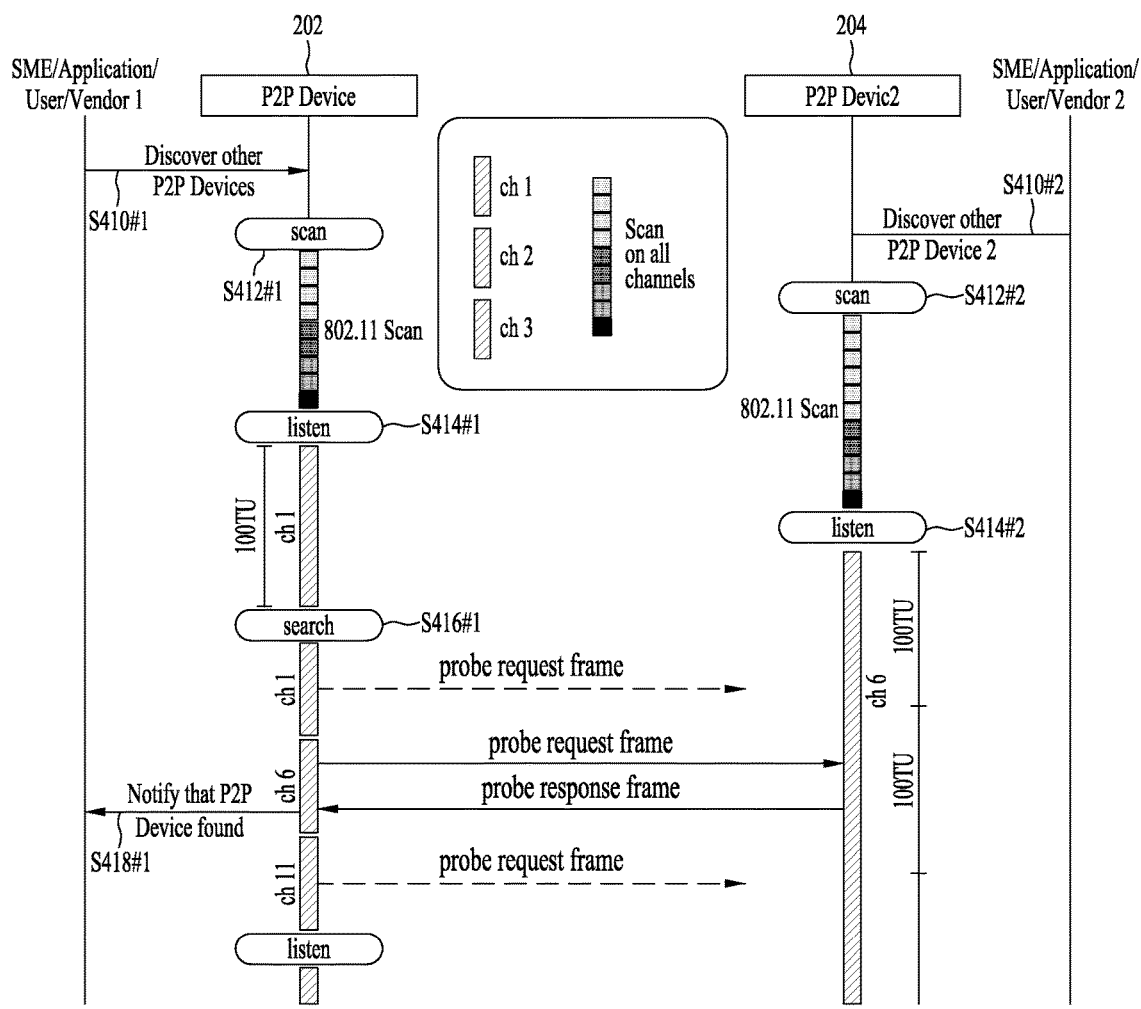
FIG. 4 is a flowchart illustrating a neighbor discovery procedure.

FIG. 4 is a diagram illustrating a signal flow for the ND procedure. The example of FIG. 4 may be understood as illustrating an operation between the WFD devices 202 and 204 illustrated in FIG. 3.

Referring to FIG. 4, the ND procedure of FIG. 3 may be initiated by a command from an SME/application/user/vender (S410). The ND procedure may be divided into a scan phase (S412) and a find phase (S414 and S416). The scan phase (S412) includes an operation for scanning all available radio channels according to IEEE 802.11. Thus, a P2P device may detect a best operation channel. The find phase (S414 and S416) includes listen mode (S414) and search mode (S416), and the P2P device repeatedly alternates between the listen mode (S414) and the search mode (S416). The P2P devices 202 and 204 perform active search using a probe request frame in the search mode (S416) and may limit a search range to social channels of channels 1, 6, and 11 (e.g., 2412, 2437, and 2462 MHz), for fast search. Also, the P2P devices 202 and 204 select only one of the three social channels and are kept in a reception state in the listen mode (S414). Upon receipt of a probe request frame in the search mode from the other P2P device (e.g., 202), the P2P device (e.g., 204) replies to the transmitting P2P device with a probe response frame. A random listen mode time may be given (e.g., 100, 200, or 300 Time Units (TUs)). The P2P devices may tune to a common channel by repeating the search mode and the reception mode. After a P2P device discovers another P2P device, the P2P device may discover/exchange a device type, a manufacturer, or a familiar device name using a probe request frame and a probe response frame in order to be selectively associated with the other P2P device. When the P2P device discovers a neighbor P2P device and acquires necessary information from the discovered P2P device by the ND procedure, the P2P device (e.g., 202) may notify the SME/application/user/vendor of the discovery of the P2P device (S418).

At present, P2P communication is used mainly for semi-static communication such as remote printing, photo sharing, etc. Along with the proliferation of Wi-Fi devices and location-based services, P2P communication has gained increasing popularity. For example, it is expected that P2P communication will be used for social chatting (e.g., recognition of a neighbor wireless device and transmission and reception of information to and from the neighbor wireless device by a wireless device subscribed to Social Network Service (SNS)), location-based advertisement, location-based news broadcasting, and game interaction between wireless devices. For the convenience's sake, these P2P applications will be referred to as new P2P applications.

Figure 5:
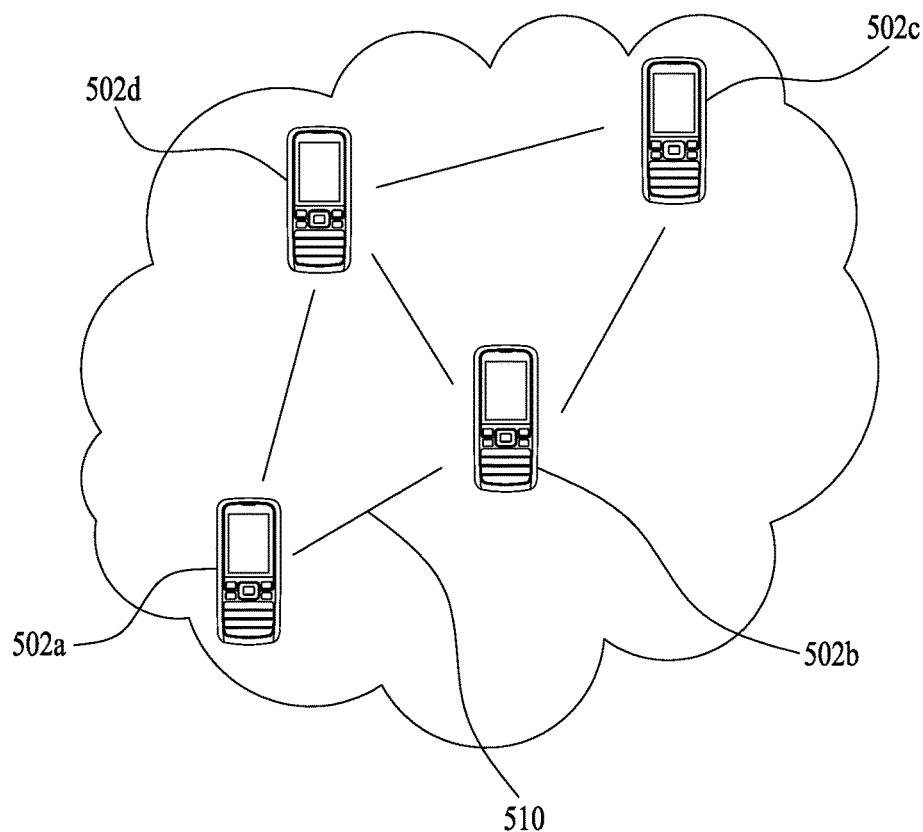
FIG. 5 is a conceptual diagram illustrating a new aspect of a Wi-Fi Direct network.

FIG. 5 illustrates a new aspect of a WFD network.

The example of FIG. 5 may be understood as a WFD network aspect in the case where a new P2P application (e.g., social chatting, location-based service, and game interaction) is used.

Referring to FIG. 5, a plurality of P2P devices 502a to 502d perform P2P communication (510) in the WFD network. A P2P device(s) that forms the WFD network may be often changed due to movement of the P2P devices(s), or the WFD network may be generated or deleted dynamically/in a short term. As described above, the new P2P applications are characterized in that P2P communication may be conducted and terminated dynamically/in a short term between a large number of P2P devices in a densely populated network environment.

Figure 6:
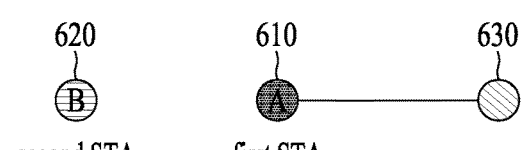
FIG. 6 is a conceptual diagram illustrating a method for configuring a Wi-Fi Direct communication link.
Figure 6:
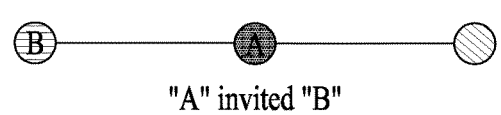

FIG. 6 illustrates a method for establishing a link for WFD communication.

Referring to FIG. 6a, a first STA (hereinafter, referred to as A) 610 is operating as a group owner in legacy WFD communication. When A 610 discovers a new WFD communication target, a second STA (hereinafter, referred to as B) 620 that is not conducting WFD communication during communication with a group client 630 in the legacy WFD communication, A 610 attempts to set up a link with B 620. In this case, since the WFD communication between A 610 and B 620 is new WFD communication and A is a group owner, communication may be set up separately from communication with the legacy group client 630. One WFD group may include one group owner and one or more group clients. As one group owner A 610 is satisfied, a WFD link may be set up as illustrated in FIG. 6b. In this case, A 610 invites B 620 to the legacy WFD communication group. In view of the nature of WFD communication, WFD communication may be possible between A 610 and B 620 and between A 610 and the legacy group client 630, but WFD communication may not be supported between B 620 and the legacy group client 630. If an Intra-BSS option is enabled (or set to On) among Wi-Fi Direct P2P group capabilities, WFD communication (direct communication between clients within the Wi-Fi Direct BSS) may be possible between B 620 and the legacy group client 630.

Figure 7:
FIG. 7 is a conceptual diagram illustrating an association method for a communication group based on Wi-Fi Direct.
Figure 7:
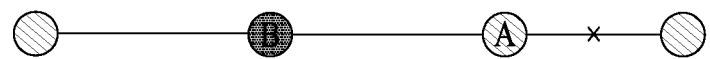

FIG. 7 is a view referred to for describing a method for associating with a WFD communication group.

Referring to FIG. 7a, a first STA (hereinafter, referred to as A) 710 as a group owner is communicating with a group client 730, and a second STA (hereinafter, referred to as B) 720 as a group owner is communicating with a group client 740. Referring to FIG. 7b, A 710 may terminate the on-going WFD communication and associate with the WFD communication group of B 720. Since B 720 is a group owner, A 710 becomes a group client. It is preferred that A 710 terminates the on-going WFD communication before requesting association to B 720.

Figure 8:
FIG. 8 is a conceptual diagram illustrating a method for configuring a Wi-Fi Direct communication link.
Figure 8:

FIG. 8 is a view referred to for describing a method for establishing a link for WFD communication.

Referring to FIG. 8a, a second STA (hereinafter, referred to as B) 820 is operating as a group owner during on-going WFD communication. While B 820 is conducting WFD communication with a group client 830, a first STA (hereinafter, referred to as A) 810 that is not conducting WFD communication and has discovered B 820 attempts to establish a link for new WFD communication with B 820. If B 820 accepts the link setup, a new WFD communication link is established between A 810 and B 820 and thus A 810 operates as a client of the WFD group of B 820. In this case, A 810 has associated with the WFD communication group of B 820. A 810 may conduct WFD communication only with the group owner B 820 and WFD communication may not be supported between A 810 and an existing WFD communication client 830. If an Intra-BSS option is enabled (or set to On) among Wi-Fi Direct P2P group capabilities, WFD communication (direct communication between clients within the Wi-Fi Direct BSS) may be possible between A 810 and the legacy group client 830.

Figure 9:
FIG. 9 is a conceptual diagram illustrating a method for configuring an association link of a Wi-Fi Direct communication group.
Figure 9:

FIG. 9 is a view referred to for describing a method for establishing a link that associates with a WFD communication group.

Referring to FIG. 9a, a first STA (hereinafter, referred to as A) 910 as a group client is conducting WFD communication with a group owner 930. Upon discovery of a second STA (hereinafter, referred to as B) 920 as a group owner communicating with a group client by another WFD communication, A 910 may terminate the link with the group owner 930 and join the WFD of B 920.

Wi-Fi Direct Service (WFDS)

WFD is a network connectivity standard technology that defines even link-layer operations. Because no standard is defined for an application operating in a higher layer of a link configured by WFD, when WFD devices are connected to each other and then execute an application, it is difficult to support compatibility. To solve this problem, the WFA is working on standardization of an operation of a higher-layer application called WFDS.

Figure 10:
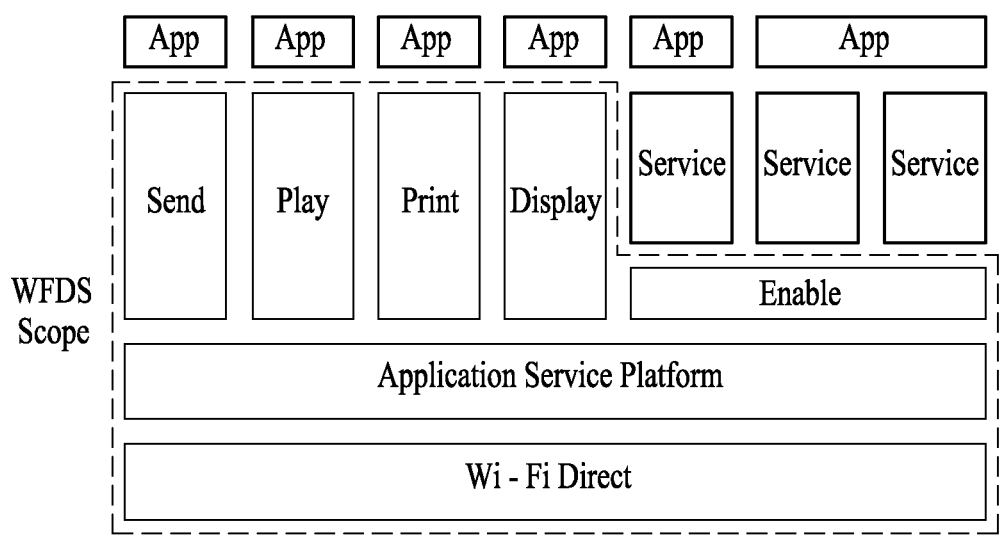
FIG. 10 is a block diagram illustrating WFDS framework constituent elements.

FIG. 10 illustrates components of a WFDS framework.

Referring to FIG. 10, a Wi-Fi Direct layer is a MAC layer defined by the Wi-Fi Direct standard. The Wi-Fi Direct layer may include software compatible with the Wi-Fi Direct standard. A wireless connection may be configured by a PHY layer (not shown) compatible with the Wi-Fi PHY layer, under the Wi-Fi Direct layer. A platform called Application Service Platform (APS) is defined above the Wi-Fi Direct layer.

The ASP is a common shared platform and performs session management, service command processing, and control and security between ASPs between its overlying Application layer and its underlying Wi-Fi Direct layer.

A Service layer is defined above the ASP. The Service layer includes use case-specific services. The WFA defines four basic services, Send, Play, Display, and Print. Also, an Enable Application Program Interface (API) is defined to use an ASP common platform when a third party application other than the basic services is supported.

While Send, Play, Display, Print, or services defined by third party applications are shown in FIG. 10 as exemplary services, the scope of the present invention is not limited thereto. For example, the term "service" may mean any of services supporting Wi-Fi Serial Bus (WSB), Wi-Fi Docking, or Neighbor Awareness Networking (NAN), in addition to Send, Play, Display, Print, or the services defined by the third party applications.

Send is a service and application that can perform file transfer between two WFDS devices. Play is a service and application that enable sharing or streaming of Digital Living Network Alliance (DLNS)-based Audio/Video (A/V), photos, music, etc. between two WFDS devices. Print is a service and application that enable output of text and photos between a device having content such as text, photos, etc. and a printer. Display is a service and application that enable screen sharing between a miracast source and a miracast sink of the WFA.

The Application layer may provide a User Interface (UI), represent information as a human-perceivable form, and provide a user input to a lower layer.

Figure 11:
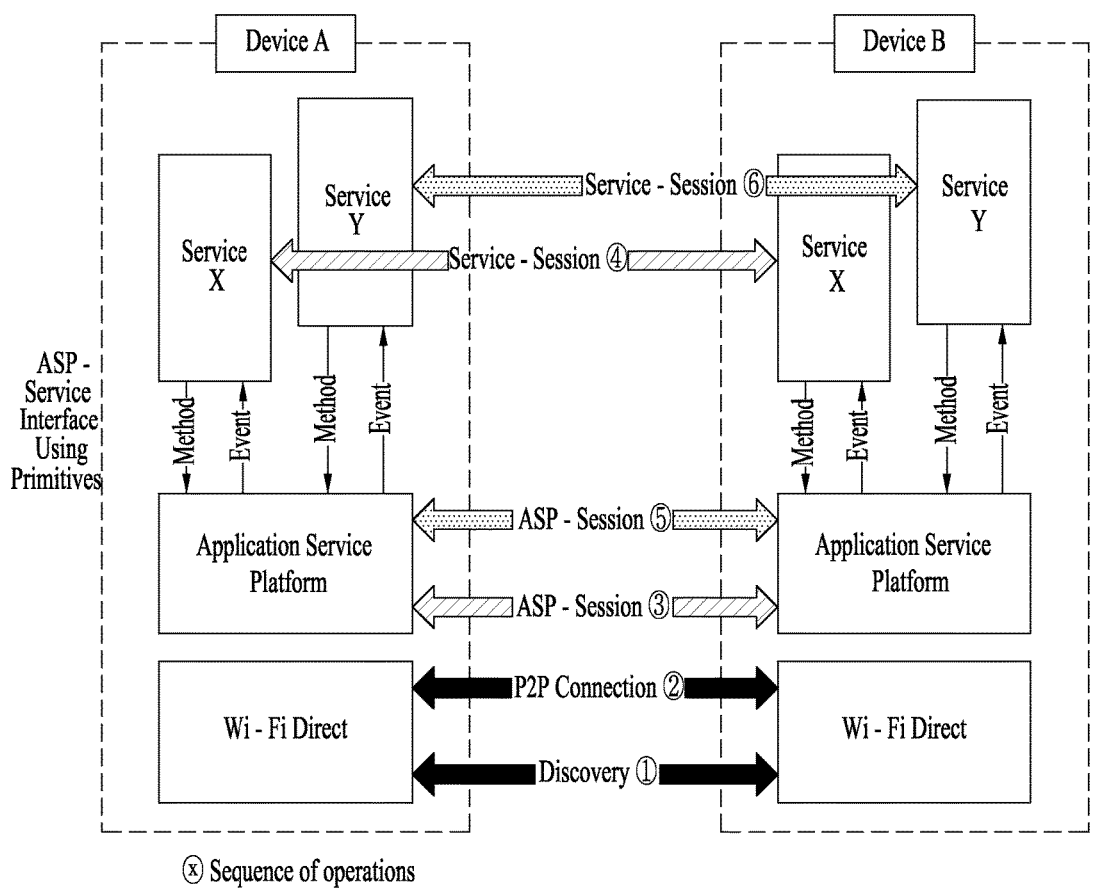
FIG. 11 is a conceptual diagram illustrating WFDS operations.

FIG. 11 is a view referred to for describing a WFDS operation.

Referring to FIG. 11, it is assumed that there are two peer devices A and B.

An ASP is a logical entity that executes common functions required for services. These functions may include device discovery, service discovery, ASP-session management, connectivity topology management, security, etc.

An ASP-session is a logical link between the ASPs of devices A and B. To initiate the ASP-session, a P2P connection needs to be set up between the peer devices. The ASP may set up a plurality of ASP-sessions between the two devices. Each ASP-session may be identified by a session Identifier (ID) allocated by an ASP requesting the ASP-session.

A service is a logical entity that provides use case-specific functions to other services or applications using the ASP. A service of one device may communicate with matching services of one or more other devices using a service-specific protocol (it may be defined by a service standard and an ASP protocol).

An interface between the ASP and the service may be defined by Method and Event. Method represents an operation initiated by the service and parameters (or fields) of Method may include information about an operation to be performed. Event provides information from the ASP to the service.

If a user wants to use service X between device A and device B, the ASP of each of the devices generates an ASP-session dedicated to service X between the devices. Then, when the user wants to use service Y, a new ASP-session for the service is established.

Figure 12:
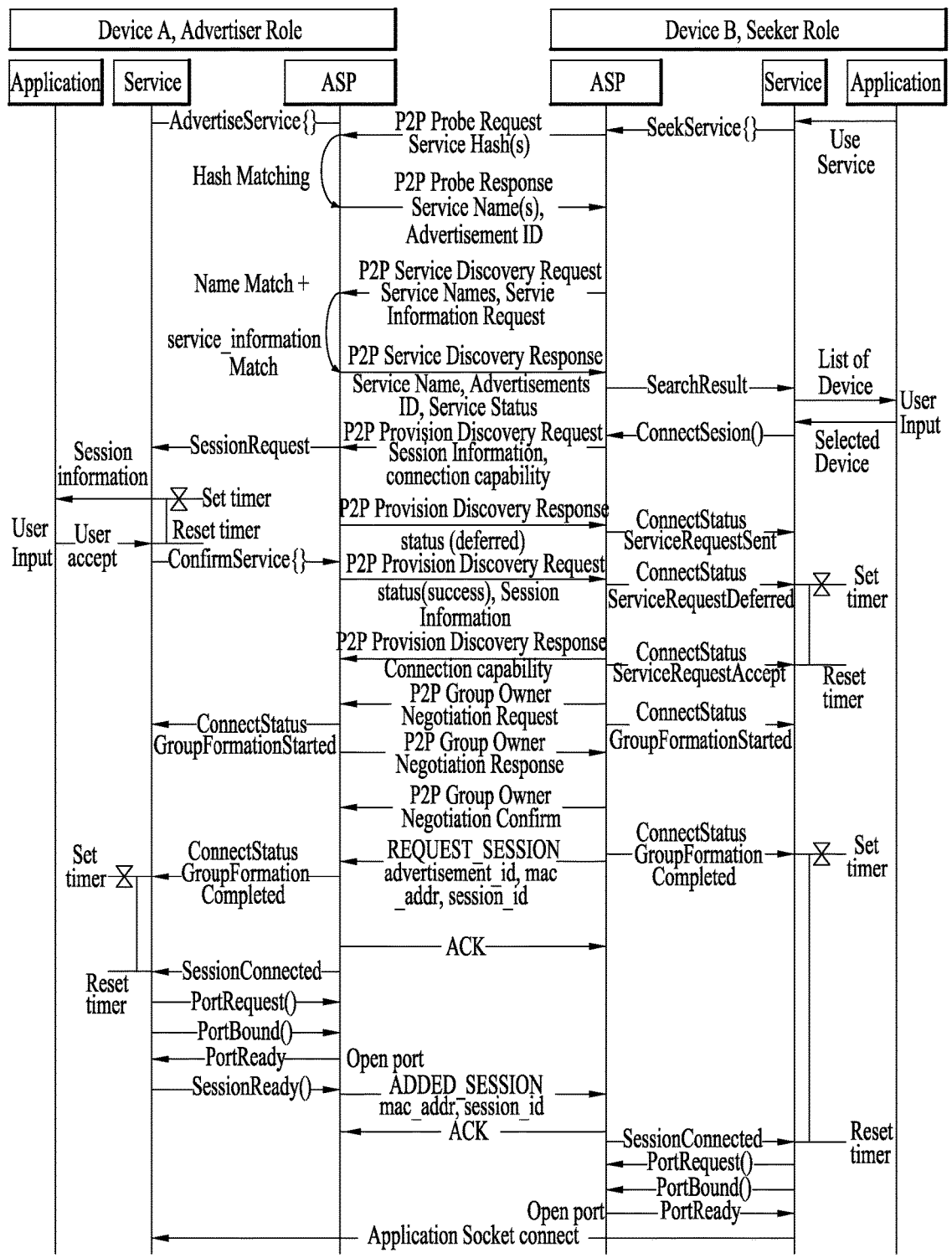
FIG. 12 is a conceptual diagram illustrating an ASP session setup sequence in WFDS.

FIG. 12 is a view referred to for describing an ASP session setup sequence in WFDS.

When operations are defined between two peer devices in WFDS, one of the peer devices may serve as an advertiser and the other peer device may serve as a seeker. The service seeker discovers a service advertiser(s) and when detecting an intended service, may request a connection to the service advertiser. In the example of FIG. 12, device A serves as an advertiser and device B serves as a service seeker.

The ASP session setup operation of FIG. 12 will be described in brief. A specific service of a WFDS device searches for another WFDS and service, requests the service, and sets up a Wi-Fi Direct connection, and then an application operates.

In FIG. 12, device A may advertise its service and wait for another device to discover the device. The ASP of device A may respond to another device based on information included an Advertisement( ) method provided by the Service layer.

Device B is a device that wants to search for a service and initiate the service. Device B searches for a device supporting the service, upon request of a higher application or a user. Upon receipt of information indicating a Use Service intention from the Application layer, the Service layer of device B may provide the information to the ASP by including information required for a SeekService( ) method.

Therefore, the ASP of device B may transmit a probe request frame to another device. The service name of the service that it wants to detect or it may support may be included in a hashed form in the probe request frame.

Upon receipt of the probe request frame, device A attempts hash matching. If device A supports the service corresponding to the hash value, device A may transmit a probe response frame to device B. A service name, an advertisement ID value, etc. may be included in the probe response frame.

This procedure for exchanging a probe request frame and a probe response frame may be referred to as a device discovery procedure in which devices A and B are identified as WFDS devices and services supported by devices A and B are determined.

Additionally, devices A and B may exchange information about details of a specific service by a P2P service discovery procedure. For example, device B may transmit information such as a service name (a plurality of service names if support or non-support of a plurality of services are to be determined), a service information request, etc. to device A by a service discovery request message. Then if service information is matched, device A may indicate to device B that the service will be provided. For example, a service discovery response message may include information such as a service name, an advertisement ID, a service status, etc. The service status information indicates whether a service requested by a remote device is available from the service advertiser. This service discovery procedure may be performed by a Generic Advertisement Protocol (GAS) defined by IEEE 802.11u.

Upon completion of the operation requested by the Seek-Service( ) method requested by the Service layer, the ASP of device B may indicate its result (i.e. SearchResult) to the application and the user by the service.

Up to this time, a Wi-Fi Direct group has not been formed. When the user selects a service and the service performs a session connection (i.e., ConnectSession), a P2P group is formed. Herein, session information and connection capability information are exchanged by a provision discovery request and a provision discovery response.

The session information is hint information that roughly describes the service requested by the service-requesting device. For example, if file transfer is requested, the session information specifies the number of files and file sizes so that the other party may determine whether to accept or reject the service request. The connection capability information may be used in generating a group in a Group Owner (GO) negotiation and P2P invitation procedure.

When device B transmits a provision discovery request message to device A, the ASP of device A transmits a session request (SessionRequest) including service information, etc. to the Service layer and the Service layer transmits the service information to the application/user. If the application/user determines to accept the session based on the session information, the application/user transmits a confirmation (ConfirmServiceQ) to the ASP through the Service layer.

During the time, the ASP of device A transmits a provision discovery response message to device B. Status may be set to Deferred in the provision discovery response message. This is done to indicate that the service is not accepted immediately and reception of a user input is awaited. Accordingly, the ASP of device B may indicate to the Service layer that the service request is deferred, while transmitting a ConnectStatus event.

Upon receipt of ConfirmService( ) at the ASP of device A, device A may perform a follow-on provision discovery procedure. That is, device A may transmit a provision discovery request message to device B. This may be referred to as the follow-on provision discovery procedure. This message may include service information together with information indicating that the status of the service is success. Therefore, the ASP of device B may indicate to the Service layer that the service request has been accepted, while transmitting a ConnectStatus event to the Service layer. Also, the ASP of device B may transmit a provision discovery response message to device A. The provision discovery response message may include connection capability information.

After the P2P provision discovery procedure, a P2P group is created and an L2 connection and an Internet protocol (IP) connection are established by the GO negotiation or invitation procedure. A detailed description of the GO negotiation procedure will not be given herein.

After the P2P connection or the IP connection is created by completion of the GO negotiation, devices A and B transmit a REQUEST_SESSION message requesting a session by an ASP coordination protocol. The REQUEST_SESSION message may include an advertisement ID, a MAC address (mac_addr), and a session ID. The MAC address is an address of a P2P device. Device A may transmit an ACK message to device B in response to the REQUEST_SESSION message.

Upon receipt of the ACK message, device A may indicate the session connection to a higher-layer service/application and the Service layer may request port information about the session and bind the session with a port. Accordingly, the ASP may open the port (the ASP may open the port within a firewall) and indicate to the Service layer that the port is ready. The Service layer may indicate to the ASP that the session is ready (SessionReady( )).

Therefore, the ASP of device A transmits an ADDED_SESSION message to the other device. The ADDED_SESSION message may include the session ID and the MAC address information. Thus, the service may be uniquely identified. Upon receipt of the ADDED_SESSION message, the ASP of device B may indicate the session connection to the Service layer and also may indicate to the Service layer that a port is ready (PortReady( )) through port request and port binding. The ASP may open the port within the firewall.

Subsequently, an application socket connection between the Service layers of devices A and B may be indicated. Since the ASP session is established in the above procedures, individual service-specific operations (for example, send, play, etc.) may be performed.

Based on the above-mentioned concepts, Wi-Fi Direct communication may be performed between a first device (P2P Device 1) and a second device (P2P Device 2). However, a long period of time is consumed for a device discovery procedure in current Wi-Fi Direct communication. A detailed description thereof will hereinafter be described with reference to FIG. 4. As described above, the first device (P2P Device 1) and the second device (P2P Device 2) may perform scanning of an available channel, may repeat a listen status and a search status, and may perform a procedure associated with probe transmission/reception (Tx/Rx). Therefore, any one of the first device (P2P Device 1) and the second device (P2P Device 2) must satisfy the listen status in the same channel, and the remaining one device must satisfy the search status in the same channel, such that transmission/reception of the probe request/response frames can be performed. As can be seen from FIG. 4, within a predetermined time of 200 TU after completion of exemplary scanning, the first device (P2P Device 1) satisfies the search status at Channel #6 and the second device (P2P Device 2) satisfies the listen status at Channel #6, and there is a high probability that a discovery procedure will be performed within a short time during actual application. The actual measurement result appears a delay of 5 or seconds, so that a user may feel uncomfortable or inconvenience. Therefore, methods for greatly reducing a time consumed for the discovery procedure will hereinafter be described with reference to the attached drawings. In accordance with the embodiment of the present invention, during the discovery procedure between the first device (P2P Device 1) and the second device (P2P Device 2), the first device (P2P Device 1) for supporting the Wi-Fi Direct service may perform scanning of an available channel, and may perform channel switching to a first channel. The first device may perform transmission/reception (Tx/Rx) of the probe request/response frames on a first channel (on the basis of a contention-based scheme). Here, the first channel may be commonly used by the first device and the second device. In this case, the first device and the second device can quickly perform the discovery procedure. As described above, in order to determine a first channel commonly used by the first device and the second device, timestamp information or the scanning result may be used, and a detailed description thereof will hereinafter be described in detail.

Embodiment 1

Figure 13:
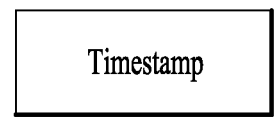
FIGS. 13 to 15 are conceptual diagrams illustrating a discovery according to a first embodiment of the present invention.

The first embodiment relates to a method for determining a first channel on the basis of a timestamp. In a broad sense, the first channel may be determined on the basis of a beacon frame. More particularly, N most significant bits (MSBs) (where N is a natural number) of a timestamp may indicate a plurality of channels (e.g., channels #1, #6, and #1) including Channel #1. In other words, channel numbers to be switched may be mapped to different bit values of N MSBs of a timestamp field contained in the beacon frame. For example, as can be seen from FIG. 13, 2 MSBs of the timestamp field composed of 8 octets shown in FIG. 13(a) may indicate a channel (number) capable of being used as the first channel as shown in FIG. 13(b). That is, if 2 MSBs of the timestamp field are denoted by 00, this means Channel #1. If 2 MSBs of the timestamp field are denoted by 01, this means Channel #6. If 2 MSBs of the timestamp field are denoted by 10, this means Channel #11.

The reason why the timestamp is used is as follows. A first reason is that a beacon frame can receive the device unassociated with the AP, and a second reason is that several MSBs of the timestamp are not easily changed (e.g., 2 MSBs may be changed after lapse of tens of thousands of years), such that, although different beacon frames can be received by a difference in operation time between two devices, the two devices can receive indication messages of the same channel. In addition, even when APs are different from each other, the same 2 MSBs are used, so that the first device and the second device may receive an indication message of the same channel.

By the above-mentioned contents, coincidence of a channel from among three delay elements (i.e., a time, a channel, and a status) of the conventional discovery procedure is achieved, such that a time consumed for discovery can be greatly reduced. Furthermore, after lapse of a predetermined time after reception of the beacon frame including the timestamp, channel switching can be performed. Different channel switching delays occur according to the operation of individual devices, such that it can be assumed that a predetermined channel switching time is present. For example, after lapse of a predetermined time (1 ms) from a reception completion time of the beacon frame, this means that switching to the first channel can be performed. By this additional structure, it may be possible for two elements (i.e., time, channel) from among delay elements of the conventional discovery procedure to be approximately identical to each other.

The first device and the second device, which have switched to the first channel, may perform probe Tx/Rx procedures, and may be based on contention (e.g., CSMA/CA, etc.). In other words, the probe request frame can be transmitted and received on the basis of contention. Here, the probe request frame may be transmitted from one device configured to win the contention for a first channel, between the first device and the second device.

Figure 14:
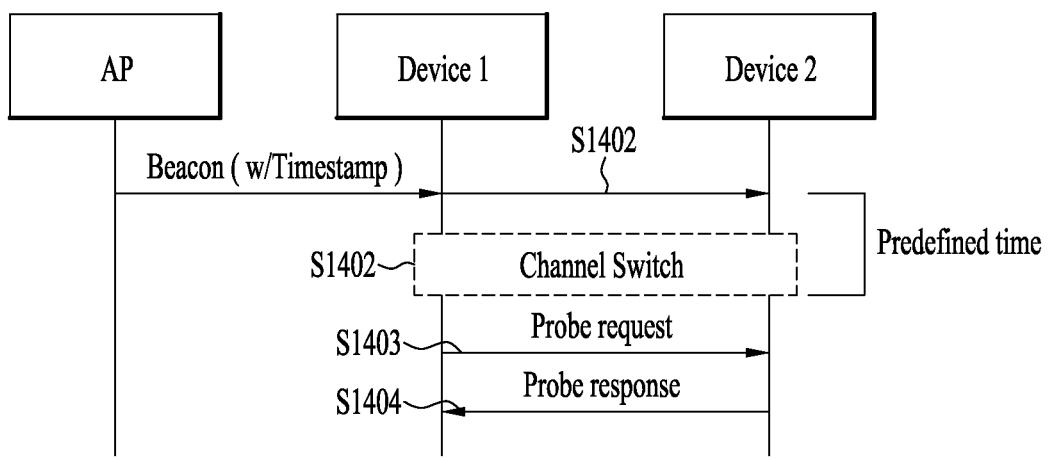

FIG. 14 is a conceptual diagram illustrating an exemplary case in which the first device and the second device belong to the same AP. Referring to FIG. 14, the first device and the second device may receive the beacon frame in step S1401. In step S1402, the first device and the second device recognize a first channel to be switched through at least some parts (e.g., 2 MSBs) of the timestamp field contained in the received beacon frame, and then perform channel switching to the first channel. Thereafter, the first device and the second device may transmit and receive the probe request/response frames on the basis of the contention through the first channel. In FIG. 14, it is assumed that the first device wins competition, so that the first device transmits the probe request frame to the second device in step S1403 and the second device may transmit the probe response frame in response to the probe request frame.

Figures 15, 16:
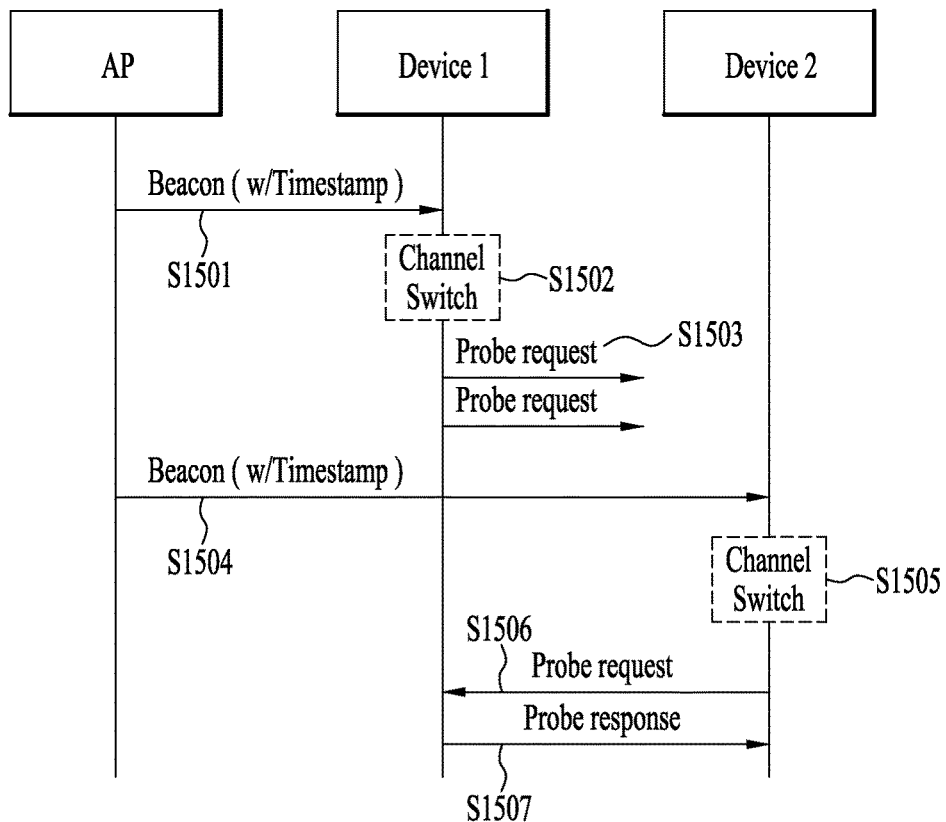
FIGS. 16 and 17 are conceptual diagrams illustrating a discovery according to a second embodiment of the present invention.

FIG. 15 shows an exemplary case in which different beacon frames are received. Although one AP is shown in FIG. 15 for convenience of description, it should be noted that the case of FIG. 15 may include not only one case in which the first device and the second device receive the beacon frame from different APs but also the other case in which the first device and the second device receive the beacon frame from the same AP at different times.

Referring to FIG. 15, the first device may receive the beacon frame in step S1501, and may perform channel switching to the first channel indicated by 2 MSBs of the timestamp field of the received beacon frame in step S1502. In step S1503, the first device may transmit the probe request frame after lapse of a predetermined time. However, the second device may not receive the beacon frame, so that the second device may not transmit a response to the probe request frame. The second device may receive the beacon frame in step S1504, and may perform channel switching to the first channel indicated by a timestamp in step S1505. Since the first device and the second device use the first channel, the first device and the second device may exchange the probe request/response frames in steps S1506 to 1507 after completion of the contention.

Embodiment 2

A second embodiment (Embodiment 2) is designed to use the result obtained by scanning the first channel. In the second embodiment (Embodiment 2), two UEs scheduled to perform Wi-Fi Direct communication are located within a short distance, such that the two UEs may use the same or similar scanning result.

In more detail, the first channel may be determined to be one channel having no AP from among Channel #1, Channel #6, and Channel #11. Alternatively, the first channel may be determined to be one channel having the lowest signal intensity from among Channel #1, Channel #6, and Channel #11. The meaning indicating the absence of AP or the low signal intensity is that low interference occurs in the discovery procedure of the first device and/or the second device. Therefore, frame transmission/reception for discovery in such a channel may be easily carried out using a low amount of power. If the number of channels having the same condition is set to zero (0) or at least 2, a low-numbered channel (Channel #6 in FIG. 16) or an arbitrary channel (e.g., Channel #11) may be determined.

The first channel may allow the first device and/or the second device to be dependent upon the AP. In other words, if the AP discovered by the first device is a certain AP, a first channel may be determined to be a predetermined channel (or a channel allocated/mapped to the AP) on the basis of the above-mentioned fact. For example, if moving images are transmitted by connecting a mobile phone to a TV through a Wi-Fi direct, this TV is fixed, such that this environment will not be frequently changed. In this case, assuming that the first device and/or the second device discover(s) a home-installed AP (denoted by MyHome), this means that two devices are scheduled to be associated with the home-installed AP, such that there is a high possibility that similar association has already been achieved in advance. If this AP is discovered, Channel #1 is determined to be the first channel.

The first channel may also be dependent upon the scanning time as necessary. For example, assuming that the first device and the second device construct the Wi-Fi Direct link at a high frequency during a specific time zone, a specific channel can be determined to be the first channel during the specific time zone. In more detail, in the case of a time zone from 21:00 to 24:00, the first channel is fixed to Channel #1. In the remaining time zones other than the time zone from 21:00 to 24:00, the legacy discovery procedure may be carried out without change. Furthermore, the first channel may be determined to be a combination of the above-mentioned examples (for example, the first channel may be a combination of the scanning result and time information).

Figure 17:
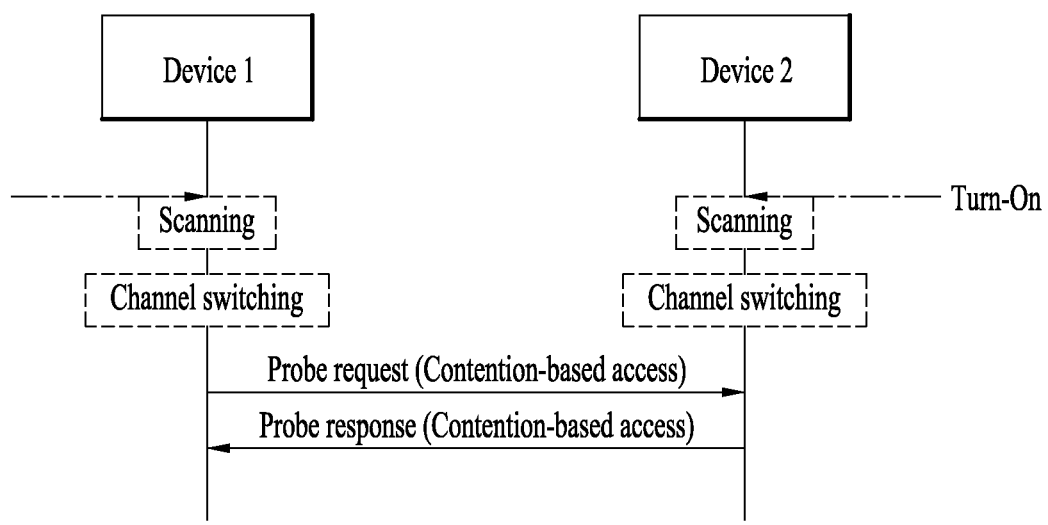

Embodiment 2 is shown in FIG. 17. Referring to FIG. 17, after the first device and the second device perform scanning, the first device and the second device may determine the first channel to be switched on the basis of the scanning result. Thereafter, the first device switched to the first channel and the second device may transmit and receive the probe request/response frames through contention, resulting in completion of the discovery procedure.

Figure 18:
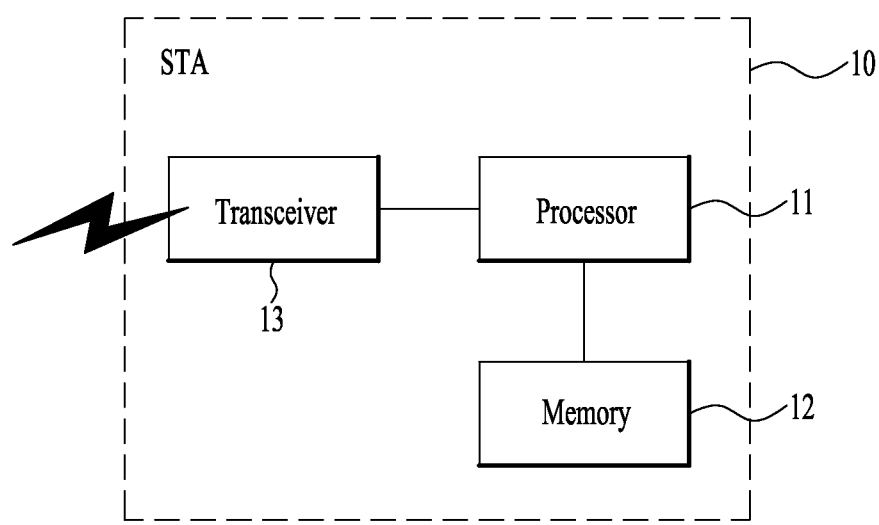
FIGS. 18 and 19 are block diagrams illustrating a radio frequency (RF) device according to an embodiment of the present invention.

FIG. 18 is a block diagram illustrating a radio frequency (RF) device according to an embodiment of the present invention.

Referring to FIG. 18, the RF device 10 may include a processor 11, a memory 12, and a transceiver 13. The transceiver 13 may transmit/receive radio frequency (RF) signals and may implement a physical layer according to an IEEE 802 system. The processor 11 may be electrically connected to the transceiver 13, and may implement a physical layer and/or a MAC layer according to the IEEE 802 system. The processor 11 may be configured to perform operations of at least one of an application, a service, and an ASP layer based on the above-described embodiments of the present invention. In addition, modules for implementing operation of the RF device according to the above described various embodiments of the present invention may be stored in the memory 12 and may be implemented by the processor 11. The memory 12 may be included in the processor 11 or may be installed at the exterior of the processor 11 to be connected by a known means to the processor 11.

The RF device 10 shown in FIG. 18 may support the Wi-Fi Direct service, and may be configured to perform the session setup. In order to create the session of the first device, the processor 11 may establish a P2P (Peer-to-Peer)

connection between the first RF device and the second RF device. Here, the P2P connection process may further include performing a provision discovery process between the first RF device and the second RF device. In order to create the session for the second service, the processor 11 may control the transceiver to transmit the session request (REQUEST_SESSION) message from the first RF device to the second RF device. Alternatively, if the RF device is the second RF device, the second RF device may be configured to receive the session request (REQUEST_SESSION) message. Session information of the second service may be contained in the session request (REQUEST_SESSION) message.

The specific configuration of the RF device 10 shown in FIG. 18 may be implemented such that the various embodiments of the present invention are performed independently or two or more embodiments of the present invention are performed simultaneously. Redundant matters will not be described herein for clarity.

Figure 19:
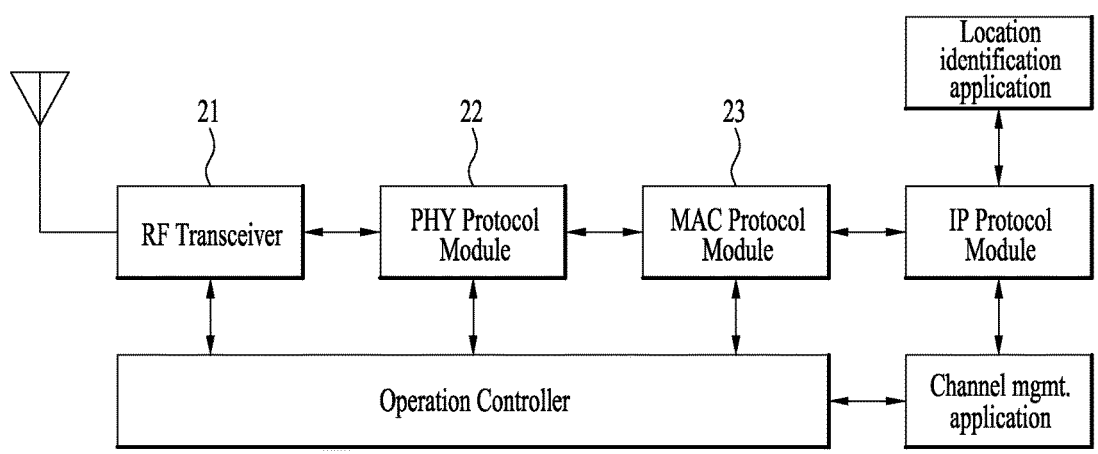

FIG. 19 is a block diagram illustrating a radio frequency (RF) device according to another embodiment of the present invention.

Referring to FIG. 19, the RF transceiver 21 may move information obtained by the PHY protocol module 22 to the RF spectrum, may perform filtering, amplification, etc., and may transmit the processed result through antennas. Alternatively, the RF transceiver 21 may move the RF signal received through the antennas to a band capable of being processed by the PHY protocol module, and may process a variety of processes such as filtering or the like. A switching function for performing switching between transmission and reception may also be performed by the RF transceiver 21 as necessary.

The PHY protocol module 22 may perform FEC encoding and modulation on data to be transmitted by the MAC protocol module 23, may insert additional signals (such as a preamble, pilot, etc.) into the data, and may transmit the inserted result to the RF transceiver, Simultaneously, the PHY protocol module 22 may perform demodulation, equalization, and FEC decoding on the signals received from the RF transceiver, and may remove the added signal in the PHY layer, such that data can be transferred to the MAC protocol module. For this purpose, the PHY protocol module may include a modulator, a demodulator equalizer, an FEC encoder, an FEC decoder, etc.

The MAC protocol module 23 may perform necessary processes so as to transmit data transmitted from a higher layer to the PHY protocol module, and may perform additional transmission actions for basic communication. For this purpose, data to be transmitted through a higher layer is fabricated to be suitable for data transmission, the data can be transmitted to the PHY protocol module, and reception data received from the PHY protocol module is fabricated and then transmitted to the higher layer. In addition, the MAC protocol module can perform other additional transmission/reception (Tx/Rx) operations needed for such data transmission, and may also process the communication protocol.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based upon an IEEE 802.11 system, the embodiments may be applied in the same manner to various mobile communication systems.

The invention claimed is:

1. A method for performing discovery by a first device supporting a Wi-Fi Direct service, comprising:
    scanning a plurality of available channels;
    performing channel switching to a first channel; and
    performing a probe transmission and reception procedure with a second device through the first channel,
    wherein the first channel is determined from one selected from among a timestamp and the scanning result, and
    wherein the 2 most significant bits (MSBs) of the timestamp indicate a plurality of channels including the first channel.

2. The method according to claim 1, wherein:
    if the first channel is determined by the timestamp and access points (APs) of the first device and the second device are identical to each other, a probe request frame is transmitted from one device winning competition for the first channel, from among the first device and the second device.

3. The method according to claim 1, wherein:
    if the first channel is determined from the scanning result, a probe request frame is transmitted from one device winning competition for the first channel, from among the first device and the second device.

4. The method according to claim 1, wherein the plurality of channels includes Channel #1, Channel #6, and Channel #11.

5. The method according to claim 1, wherein:
    if the first channel is determined by the timestamp, the channel switching is performed after lapse of a predetermined time after reception of a beacon frame including the timestamp.

6. The method according to claim 1, wherein:
    if the first channel is determined from the scanning result, the first channel is set to one channel having no access point (AP) from among Channel #1, Channel #6, and Channel #11.

7. The method according to claim 6, wherein:
if there are two or more channels in which AP does not exist, the first channel is a channel having the lowest channel number of the two or more channels.

8. The method according to claim 1, wherein:
if the first channel is determined from the scanning result, the first channel is one channel having the lowest signal intensity from among Channel #1, Channel #6, and Channel #11.

9. The method according to claim 1, wherein:
if the first channel is determined from the scanning result, the first channel is dependent upon an access point (AP) discovered by the first device.

10. The method according to claim 9, wherein:
the access point (AP) has association in advance before the first device and the second device perform the discovery.

11. The method according to claim 1, wherein:
if the first channel is determined from the scanning result, the first channel is dependent upon the scanning time of the first device.

12. A first device for supporting a Wi-Fi Direct service, comprising:
a reception (Rx) module; and
a processor,
wherein the processor scans a plurality of available channels, performs channel switching to a first channel, and performs a probe transmission and reception procedure with a second device through the first channel,
wherein the first channel is determined from one selected from among a timestamp and the scanning result, and
wherein the 2 most significant bits (MSBs) of the timestamp indicate a plurality of channels including the first channel.

* * * * *